United States Patent [19]

Donovan et al.

[11] Patent Number: 4,847,961
[45] Date of Patent: Jul. 18, 1989

[54] METHOD AND APPARATUS FOR STITCH-MACHINING DEEP CAVITIES IN METAL WORKPIECES

[75] Inventors: David A. Donovan, Chelsea; Nathaniel Field, Northville, both of Mich.

[73] Assignee: Ford Motor Company, Dearborn, Mich.

[21] Appl. No.: 137,772

[22] Filed: Dec. 24, 1987

[51] Int. Cl.⁴ .................. B23B 39/00; B23B 35/00; B23L 1/00
[52] U.S. Cl. .................... 29/56.5; 29/26 A; 408/1 R; 408/159; 408/165; 408/709
[58] Field of Search .............. 408/153, 158, 159, 1 R, 408/22, 54, 72 R, 75, 129, 163, 165, 168, 169, 708, 709; 29/26 A, 56.5

[56] References Cited

U.S. PATENT DOCUMENTS

| | | | |
|---|---|---|---|
| 1,562,969 | 11/1925 | Jordan et al. | 408/20 |
| 1,844,316 | 2/1932 | Fryckberg | 408/75 |
| 3,273,423 | 9/1966 | Rottler | 408/709 |
| 3,438,289 | 4/1969 | Kampmeier | 408/143 |
| 3,542,528 | 11/1970 | Bech | 408/153 |
| 4,133,089 | 1/1979 | Heymanns | 408/22 |
| 4,307,636 | 12/1981 | Lacey | 408/159 |
| 4,357,846 | 11/1982 | Primo | 408/129 |
| 4,414,869 | 11/1983 | Augustine | 408/11 |
| 4,436,460 | 3/1984 | Powell | 408/14 |
| 4,480,366 | 11/1984 | Takahashi | 29/26 A |

FOREIGN PATENT DOCUMENTS

| | | | |
|---|---|---|---|
| 859849 | 12/1952 | Fed. Rep. of Germany | 408/159 |
| 0071015 | 4/1983 | Japan | 408/129 |

*Primary Examiner*—Bruce Y. Arnold
*Assistant Examiner*—Ronald M. Kachmarik
*Attorney, Agent, or Firm*—Joseph W. Malleck; Roger L. May

[57] ABSTRACT

Stitch-machining the walls of a cylindrical blind cavity of a workpiece, the cavity being deep and narrow with respect to the axis of the cavity, is carried out by: (a) supporting a tubular housing for axial movement throughout substantially the axial extent of the cavity interior and in close-fitting tolerance to the walls of the cavity, the tubular housing having a free end; (b) rotationally driving a spindle (10,000–40,000 rpm) in the tubular housing for conjoint axial movement with the tubular housing, the spindle extending beyond the housing end for carrying a radially adjustable cutting tool; (c) inserting the tubular housing together with the rotationally driven spindle into the cavity (at lineal speeds of 400–800 inches/minute) with a cutting tool radially positioned for rough boring of the cavity walls, while guiding and steering the tubular housing and spindle to accurately concentrically position the cutting tool with respect to the cavity axis; (d) substantially immediately upon the execution of rough boring, withdrawing the tubular housing together with the rotationally driven spindle from the cavity with the cutting tool repositioned for finish boring of the cavity wall during withdrawal; and (e) upon substantial execution of finish boring and withdrawal of the tubular housing and spindle into a fixed housing positioned closely adjacent the face of the workpiece, moving said workpiece relatively transversely with respect to the axis of the spindle for carrying out milling while radially adjusting the cutting tool for milling of the face, the tubular housing being guided and steered within the fixed housing to attain close milling tolerances.

12 Claims, 5 Drawing Sheets

METHOD AND APPARATUS FOR STITCH-MACHINING DEEP CAVITIES IN METAL WORKPIECES

Background of the Invention

1. Technical Field

This invention relates to the art of boring metal workpieces, such as engine blocks and, more particularly, to conducting rough boring, finish boring and face milling on an engine block having one or more blind cavities.

2. Description of the Prior Art

Machining of precast cylinder cavities in engine blocks has required a number of separate machining operations to provide rough and finish boring, and face milling of the flat surface surrounding the bore mouth. A boring bar, carrying a rotary cutting tool, is lowered into the cavity with machining taking place on the downward stroke of the boring bar into the cavity at a fixed, predetermined diameter. If steps or multiple diameters are to be machined into the cavity wall, multiple cutting tools are preset at varying diameters to be used in the downward machining stroke (see U.S. Pat. No. 4,436,460). If face milling is added to boring, a special shaped tool may be used to accomplish a limited amount of both tasks (see U.S. Pat. No. 4,414,869). Due to the essential independency of each machining operation, maintaining accuracy and concentricity is a slow, laborious job under such prior teachings, often requiring manual gauging techniques prior to the downward stroke (see U.S. Pat. Nos. 1,562,969 and 1,844,316).

With the advent of high-speed machining, using a rotary tool at 10,000-40,000 rpm, the need for conducting all machining operations on the downward stroke is a hindrance. Different machining operations are now visualized in accordance with this invention, whereby one machining operation is conducted on the downward stroke, and another machining operation is conducted on the upward stroke. It may also be visualized to sometimes include a third machining operation so that upon withdrawal of the cutting tool from the bore, it can be moved immediately across the face of the workpiece. This kind of motion: down, up and sometimes across, is referred to herein as stitch-machining.

The problem with attempting stitch-machining at high speeds is the difficulty of accurately controlling the cutting tool at precise tolerances. This problem is compounded when deep, narrow cavities are to be stitch-machined, such as presented in new engine blocks of the monoblock type. A monoblock construction has the head and block integrated together as one piece, presenting blind cylindrical bores (ones which do not extend through opposite sides of the workpiece). The boring bar, by necessity, must have a long, unsupported overhang portion to extend into such blind bore. No art is known to the inventors that addresses the use and steering of such long, unsupported boring bar overhang portions. U.S. Pat. No. 3,438,289 describes a method of boring along a deep axis through several bearing walls, but uses a pilot at both ends to obviate the problem of an unsupported end.

To conduct high-speed stitch-machining invites the need for simple radial adjustment to utilize the same cutting tool for performing one machining operation on the downward stroke and another machining operation on the upward stroke. This necessitates a different orientation of the cutting tool and demands some mechanism for adjustment. Obviously manual adjustment prior to the machining stroke, as shown in U.S. Pat. Nos. 1,562,969 and 1,844,316, is inadequate since it does not occur during real time (the time during the machining stroke itself).

SUMMARY OF THE INVENTION

A primary object of this invention is to provide a method and apparatus for conducting stitch-machining in deep, narrow, blind cavities of a workpiece and, secondarily, to do so with excellent, close machining tolerances while operating at (i) boring bar rotational speeds of 10,000-40,000 rpm, and (ii) high insertion and withdrawal rates.

The invention herein accomplishes such objects by the use of a tubular housing to conjointly move axially with a rotary driven spindle supported therein, the tubular housing facilitating steering of the free end of the spindle by the use of adjustable bearings to attain close tolerance boring, and by the use of a fixed housing telescopically supporting the axially movable tubular housing to facilitate close coupled holding of the free end of the tubular housing during face milling to attain close milling tolerances.

The method of this invention specifically comprises a series of steps for stitch-machining the walls of a cylindrical blind cavity of a workpiece, the cavity being deep and narrow with respect to the axis of the cavity, comprising: (a) supporting a tubular housing for axial movement throughout substantially the axial extent of the cavity interior and in close-fitting tolerance to the walls of the cavity, the tubular housing having a free end; (b) rotationally driving a spindle in the tubular housing for conjoint axial movement with the tubular housing, the spindle extending beyond the housing end for carrying a radially adjustable cutting tool; (c) inserting the tubular housing together with the rotationally driven spindle into the cavity with a cutting tool radially positioned for rough boring of the cavity walls, while guiding and steering the tubular housing and spindle to accurately concentrically position the cutting tool with respect to the cavity axis; and (d) substantially immediately upon the execution of rough boring, withdrawing the tubular housing together with the rotationally driven spindle from the cavity with the cutting tool repositioned for finish boring of the cavity wall during withdrawal.

To facilitate milling as part of the stitch-machining, the method further comprises the additional step of: (e) upon substantial execution of finish boring and withdrawal of the tubular housing and spindle into a fixed housing positioned closely adjacent the face of the workpiece, moving said workpiece relatively transversely with respect to the axis of the spindle for carrying out milling while radially adjusting the cutting tool for milling of the face, the tubular housing being guided and steered within the fixed housing to attain close milling tolerances.

Preferably, the method is carried out at spindle speeds in the range of 10,000-40,000 rpm, and with insertion and withdrawal rates for the tubular housing at lineal speeds in the range of 400-800 inches/minute.

Preferably the cutting tool is radially adjusted by use of a pivotal arm support, which arm support is cammed in a radial direction by use of a rod extending axially through the spindle.

Advantageously, the guiding is carried out by use of adjustable fluidic bearings using diametrically balanced hydrostatic fluid pressure, communicated to opposed sides of the spindle and tubular housing to maintain a fluid film thereabout; steering is carried out by momentarily directing unbalanced hydrostatic fluid Pressure against the exterior of the tubular housing to attain incremental radil adjustments. Hydrostatic fluid pressure is directed through the tubular housing to axial locations therealong for use in performing as an adjustable fluid bearing and for use in steering the housing. The fluid used to exert forces against the cavity wall for concentric alignment also serves to effect fluidic damping of the spindle and cutting tool.

The apparatus of this invention which is specifically adapted for stitch-machining the walls of an axially deep and narrow, cylindrical cavity of a workpiece, comprises: (a) a rotary driven spindle of sufficient length to extend substantially throughout the axial extent of the cavity, the spindle carrying a radially adjustable cutting tool at its extremity; (b) a tubular housing support for journaling the spindle, the tubular housing being axially moveable for conjoint axial movement with said spindle and fixed against rotational movement; (c) means for accurately guiding and steering the tubular housing support and spindle within the cavity; and (d) means for radially adjusting the orientation of the cutting tool to effect different modes of machining with the tool.

DETAILED DESCRIPTION AND BEST MODE

Figure 1:
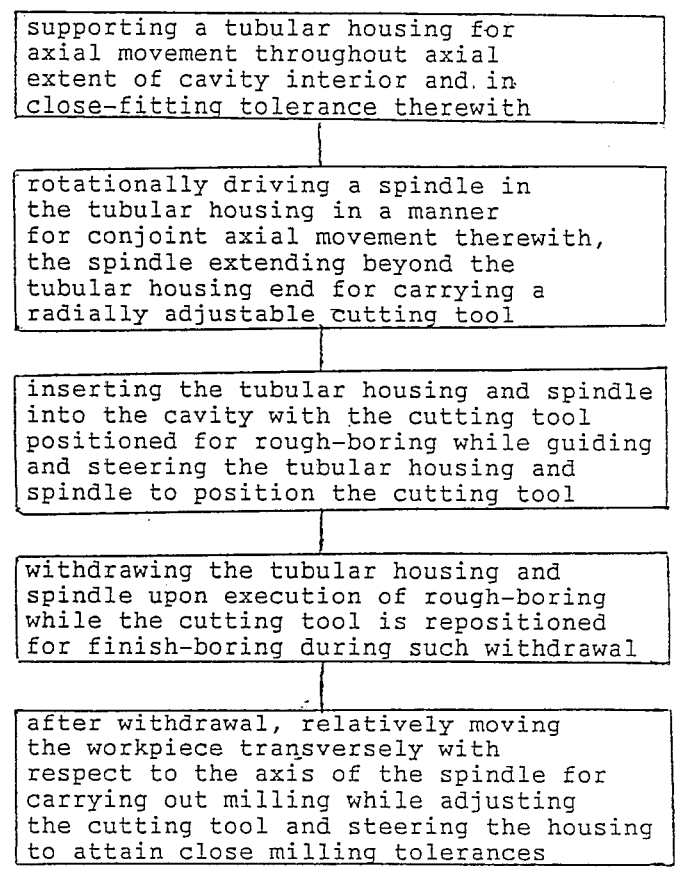
FIG. 1 is a flow diagram of the steps of the method aspect of this invention.

As shown schematically in FIG. 1, the comprehensive method of stitch-machining the walls of a cylindrical blind cavity of a workpiece (the cavity being deep and narrow with respect to the axis of the cavity), comprises the steps of: (a) supporting a tubular housing for axial movement throughout substantially the axial extent of the cavity interior and in close-fitting tolerance to the walls of the cavity; (b) rotationally driving a spindle in the tubular housing in a manner for conjoint axial movement therewith, the spindle extending beyond the tubular housing for carrying a radially adjustable cutting tool; (c) inserting the tubular housing and spindle into the cavity with the cutting tool positioned for rough boring while guiding and steering the tubular housing and spindle for precise positioning of the cutting tool; (d) withdrawing the tubular housing and spindle upon execution of rough boring while the cutting tool is repositioned for finish boring during such withdrawal; and (e) after withdrawal, movingq the workpiece relatively transversely with respect to the axis of the spindle for carrying out milling while adjusting the cutting tool and steering the housing to attain close milling tolerances.

The stitch-machining operation of such method is preferably carried out so that the spindle is rotationally driven at speeds in the range of 10,000–40,000 rpm, and the tubular housing and spindle is inserted and withdrawn from the cavity at lineal speeds of 400–800 inches/minute.

Each of such steps is now discussed with reference to structure for carrying out the method.

Supporting

Figure 2:
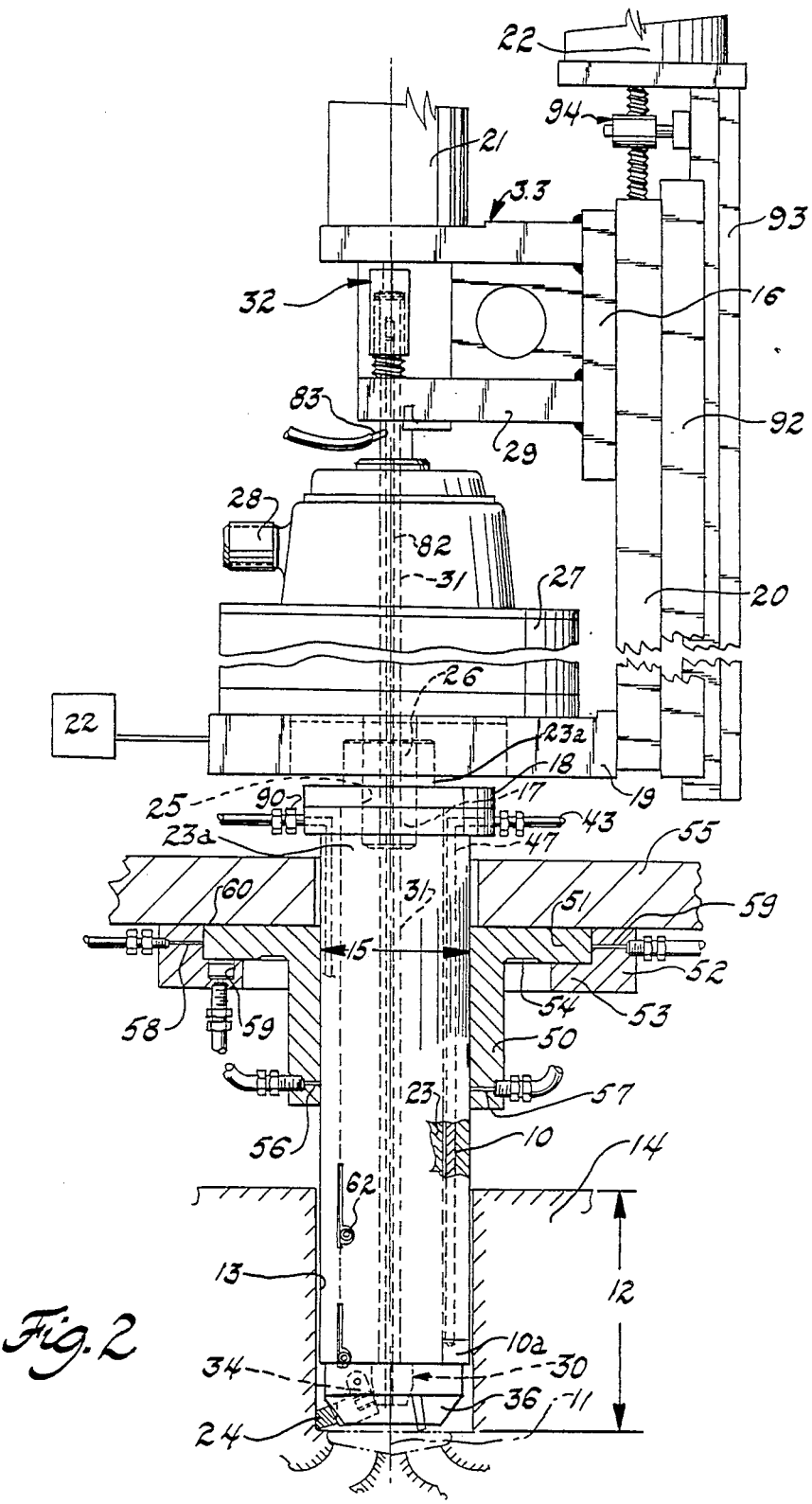
FIG. 2 is an elevational view of the apparatus used to carry out the method of this invention and depicts the apparatus embodying this invention, portions of the workpiece and fixed housing being shown in cross-section.
Figure 3:
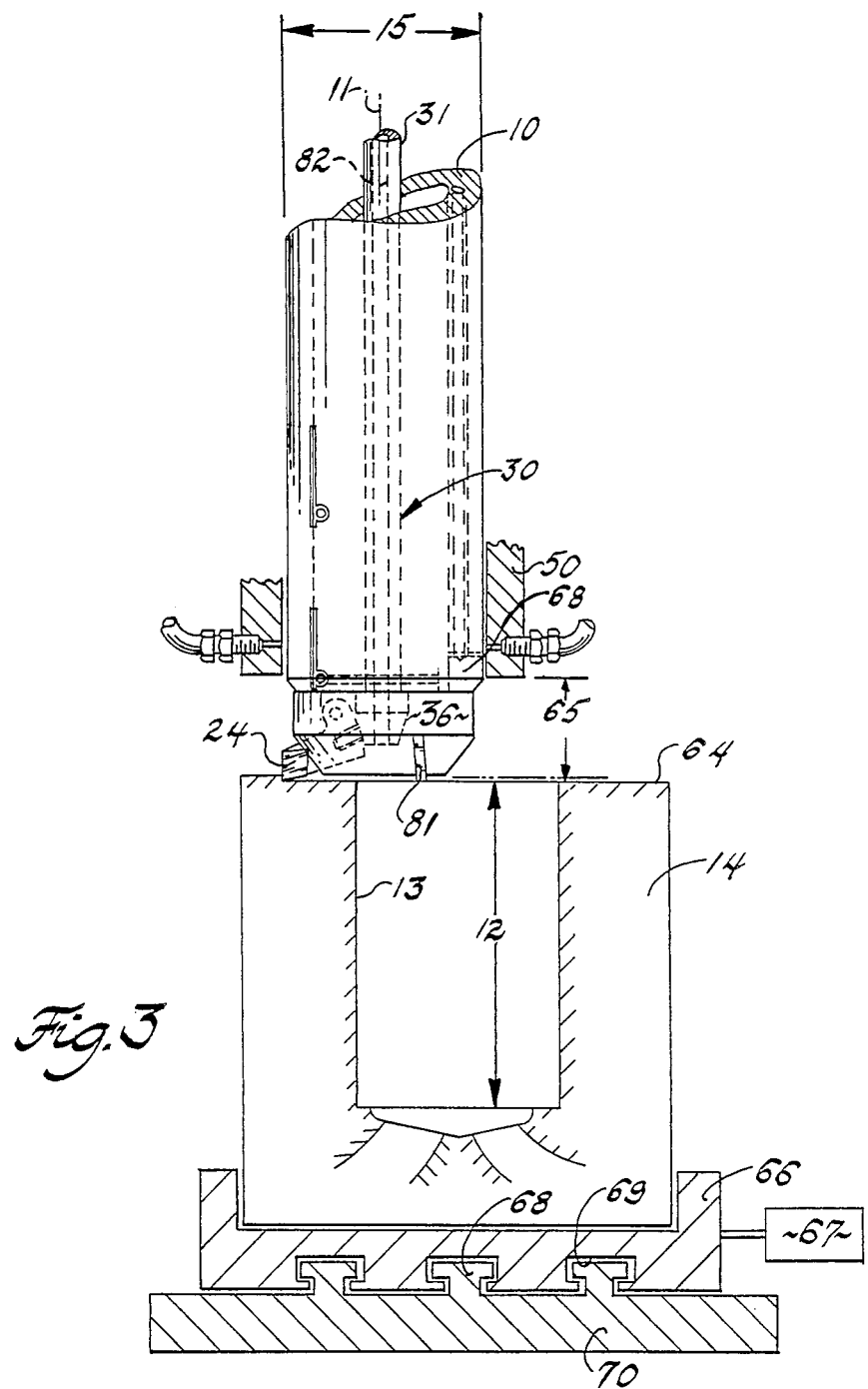
FIG. 3 is a view of a portion of FIG. 2 showing the tubular housing and spindle in a milling operation position and further illustrates means for relatively moving the workpiece with respect to the spindle.

As shown in FIGS. 2 and 3, a tubular housing 10 is employed for axial movement along axis 11 and throughout substantially the axial extent 12 of the interior of cavity 13 of the workpiece 14. The tubular housing 10 is constructed of tubular steel having a diameter 15 substantially the same but slightly less than the diameter of cavity 13 to be bored. The tubular housing should be in close-fitting tolerance to the walls of such cavity, preferably within a tolerance range of 0.008–0.012 inches. The axially moveable tubular housing structure has its bottom end 10a floating on the spindle head 36 and its upper end (flanged upper portion 17) secured by the presence of a flange 18 on the spindle 23 (see FIG. 6). The tubular housing is thus free to move axially with the spindle, but is fixed against rotary movement by pneumatic connections made at 90 or by other suitable fixing means.

Driving Spindle

Figure 6:
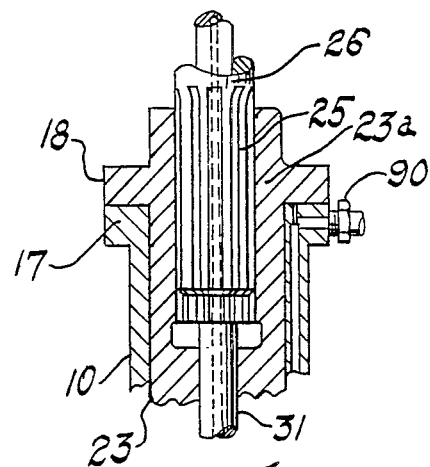
FIG. 6 is an enlarged sectional view of the spindle connection to the motor shaft.

The spindle 23 is journaled in the tubular housing 10 for rotary movement therein and is also supported in a manner to permit conjoint axial movement of the tubular housing therewith; the spindle extends beyond the housing end 10a to carry a spindle head 36 not only for supporting the tubular housing, but for carrying a radially adjustable cutting tool 24. As shown in FIG. 6, the spindle 23 is connected by a splined connection 25 at its upper end 23a to an armature 26 of a rotationally driving, high-speed brushless motor 27 (shown in FIG. 2), the motor being supported on a plate 19; the electric motor receives its source of energy through suitable power connections at 28. The plate 19 is connected to a vertical brace 20 which in turn is secured to a connector plate 92 for vertical movement along a rail 93 by way of a dovetail or key slot connection (not shown). A conventional piston and cylinder actuator 22 is employed for moving the brace 20 and connector plate 21 along such rail via a ball screw assembly 94.

Insertion

As shown in FIG. 2, the tubular housing 10, together with the rotationally driven spindle 23, is inserted into the cavity 13 by lowering plate 19 through actuator 22; the insertion rate is in the range of about 400–800 inches/minute. The cutting tool is radially positioned for rough boring by use of an adjustment means 30 which comprises an adjustment rod 31 which extends axially and concentrically through the center of the spindle 23 and extends through the motor 27 for connection to a screw drive actuator 32 having a motor 21. The actuator is supported, in turn, on a pair of plates 33 and 29 which are connected by member 16 to brace 20 also for vertical movement along rail 93; thus, actuator 32 is coupled to the plate 19 for conjoint movement in response to the elevation or de-elevation of spindle 23 and tubular housing 10. The independenly axially moveable rod 31 is caused to selectively move downward on actuation of the screw drive in one rotational direction and caused to move upward or elevated in response to the reverse rotation of the screw drive.

Figure 4:
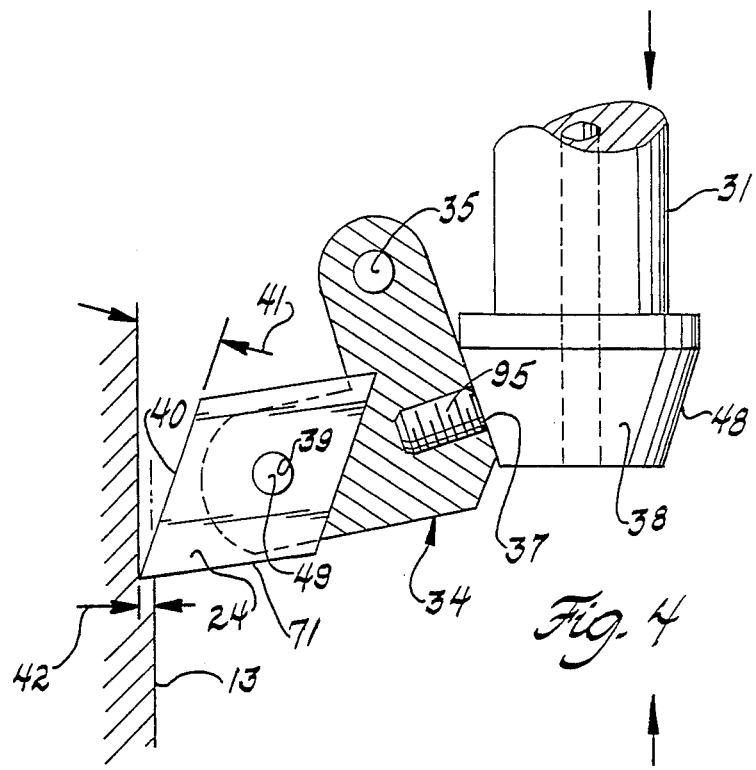
FIG. 4 is an enlarged fragmentary view of a Portion of the cutting tool and radial adjusting means showing the cutting tool in a rough boring mode.

To facilitate a rough boring cutting tool position, such as shown in FIG. 4, the cutting tool is mounted on a pivot arm 34. The tool, itself, has a preformed central opening 39 to act as a surface for fastening the cutting tool to a pin 49 on the pivot arm 34. The L-shaped pivot arm 34 pivots on a pivot pin or axis 35, which axis is secured to the side of the spindle head 36 (as shown in FIG. 3) offset from the axis 11 of the spindle 23.

The pivot arm 34 carries a radially actuatable contact surface 37 to permit the pivot arm to swing to and from the wall of cavity 13. Such surface 37 may be adjustable by use of a screw 95. The bottom end of the rod 31 carries a conical camming member 38 having a surface 48 mateable with the contact surface 37 of the pivot arm so that as the rod 31 is lowered within the tubular housing 10, the camming head 38 will contact surface 37 and move it radially outwardly.

In the position of the cutting tool of FIG. 4, the cutting tool has a surface 40 which is positioned to have a side relief angle 41 great enough, such as in the range of 15–22 degrees, to provide for a heavy depth cut 42 and thereby perform a rough boring operation on the downward stroke of the tubular housing and spindle. This large side relief angle is promoted by an elevated position of the rod 31 with respect to the pivot arm.

Figure 5:
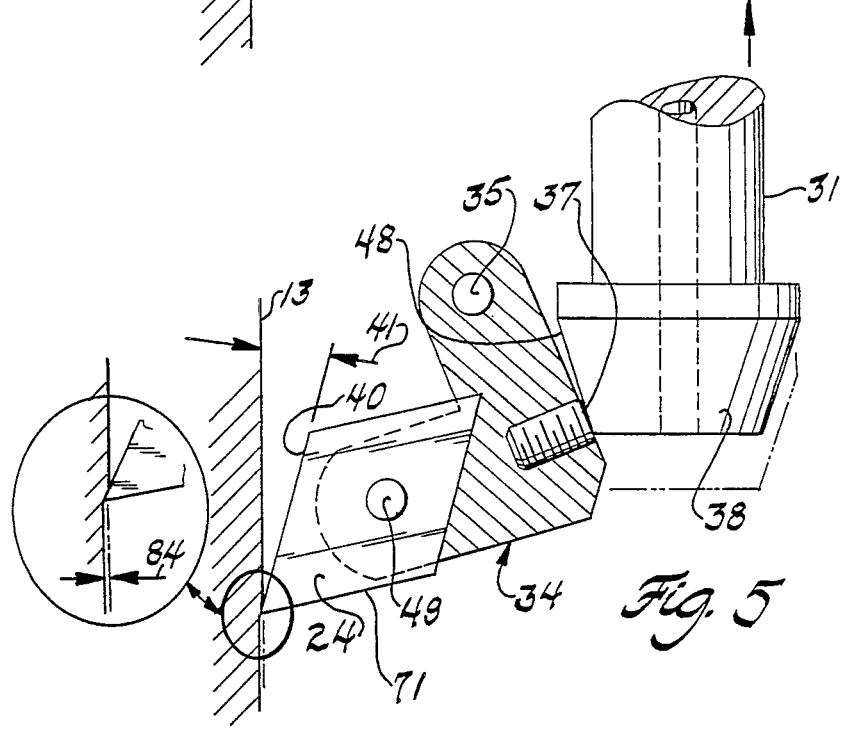
FIG. 5 is a view similar to that of FIG. 4, illustrating the cutting tool and adjusting means in a finish boring mode.

In the position of the cutting tool of FIG. 5, the tool has surface 40 positioned to have a side relief angle 41 of about 8–15 degrees, effective to promote finish boring on the upward stroke of tubular housing 10 and spindle 23. The depth of cut 84 is considerably smaller.

Figure 7:
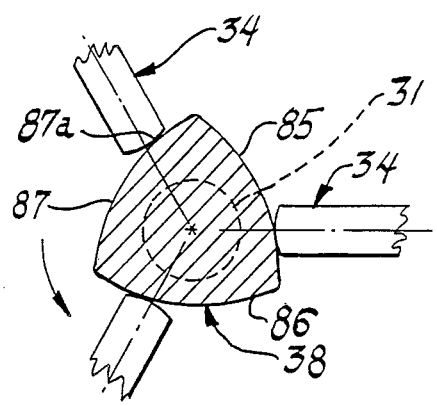
FIG. 7 is an enlarged schematic sectional view of an alternative mode for radially adjusting the pivot arms for the cutting tools.

If a plurality of cutting tools are arranged equi-circumferentially about the spindle head 36 (which is desirable for rough boring), but only one of the cutting tools is to be used during finish boring, then an alternative radial adjusting means may be employed, as shown in FIG. 7. The rod 31 is modified to have a camming head 38 redefined with separated camming surfaces 85, 86 and 87, but only camming surface 87 has an extended profile at 87a to move its pivot arm 34 a greater distance when the rod 31 is rotated (rather than elevated or deelevated). Thus, rotary camming to one angular extreme attains equal radial adjustment of all three arms 34 for rough boring, and movement to the other rotary extreme attains more radial adjustment for only one of the pivot arms to effect finish-machining with one cutting tool.

Figure 8:
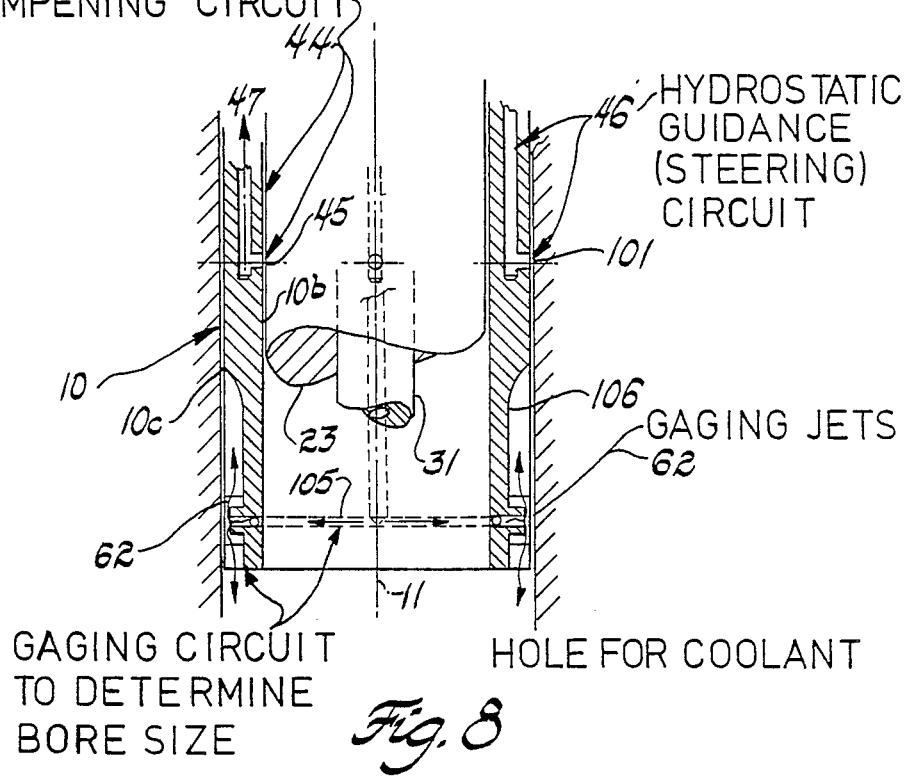
FIG. 8 is an enlarged sectional view of the spindle and tubular housing.

The spindle 23 and/or tubular housing 10 are guided for accurate positioning by use of adjustable fluidic bearings 44 which consist of orifices 45 located at several axial positions along the length of the tubular housing 10 (see FIG. 8). Orifice 45 communicates between a hydrostatic fluid pressure supply 47 with the interior surface 10b of the tubular housing. Alternatively, an orifice may communicate such supply 47 with the exterior surface 10c of the tubular housing so that orifices 45 and such other orifice are diametrically opposed. Several orifices 45 are located equi-circumferentially about the inner surface of the tubular housing; they are located in pairs to promote equal and opposite fluid films on diametrically opposite sides of the spindle. Preferably, at least four pairs of such orifices 45 should be employed to attain the desired guiding and concentricity of this invention, although as little as two pairs may be envisioned. Orifices 61 are also directed downwardly through tubular housing end 10a to provide a floating fluid film between the upper surface 62 of spindle head 36 and the housing. The hydrostatic fluid pressure supply is comprised of passages extending along the interior body of the tubular housing to connect at 43 with exterior pressure supply tubes. The guided orifice provides such a film of fluid between the spindle and tubular housing and/or the tubular housing and cavity wall. Preferably, the fluid pressure supply is in the range of 20–40 psi and is adjustable to assure concentric alignment.

To facilitate steering of the tubular housing 10, a hydrostatic fluid pressure circuit 46 is employed. Such circuit has orifices 101, defined in the outer surface 10c of the tubular housing, at various circumferential locations thereof, but at different locations than the bearing orifices 45. The orifices 101 are located at a sufficient number of circumferential locations so that a desired fluid force will be properly directed from a selected orifice when the other orifices are not activated. Hydrostatic fluid pressure is injected for selected moments through one or more selected ones of these orifices 45 to impart a steering force. The steering force results from the reaction of the fluid pressure against a confronting surface to the orifice.

To further facilitate steering of the tubular housing and spindle, a tubular collar 50 (as shown in FIG. 2) is employed having a flat flanged portion 51 supported on a fixed annular seat 52 which, in turn, has an annular supporting flange 53 for carrying the bottom surface 54 of the collar flange 51. The flange 51 is held between the seat flange 53 and a supporting platform 55. Thus, the collar is capable of slight radial adjustment while being fixed against axial movement. The tubular housing may be steered by injection of hydrostatic pressurized fluid through circumferentially spaced pairs of diametrically opposed orifices 56,57 located in a bottom axial location of the collar 50 and orifices 58,59 in an upper axial location of seat 52. By directing momentarily unbalanced hydrostatic fluid pressure through one of the orifices of a pair, the tubular housing or collar may be caused to incrementally move for radial adjustment. Once the precise radial adjustment is achieved for the collar and the tubular housing within the collar, such interrelationship may be fixed by use of hydrostatic pressure deployed through ports 59 to clamp the upper surface 60 of the collar flnge 51 against the platform 55.

To determine the effectiveness of the hydrostatic bearings, pairs of diametrically opposite gauging nozzles 62 may be employed within the tubular housing 10 at various axial locations different than that for the hydrostatic bearings, but desirably in or close to the spindle head. Hydrostatic fluid flow through the orifices 62 is restricted by the frontal positioning of the cylindrical wall of cavity 13. If the space between such walls 13 and the orifices 62 is closed or restricted, the back-pressure of the hydrostatic fluid flow is increased due to the restriction and thereby increases the fluid pressure communicated to the other opposed orifice 62. There exists a definite relationship between (i) the clearance between the orifice and the restricting wall and (ii) the back-pressure. The hydrostatic fluidic pressure supply for the gauging is maintained in the pressure range of 12-44 psi. The pressure that is supplied to gauging nozzles 62 is sensed by either a straight or differential pressure transducer to determine the degree of back-pressure and thereby render an indication of the positioning of the tubular housing within the cavity. Similarly, gauging nozzles may be employed to sense the positioning of the spindle 23 within the tubular housing 10. Pressure supply to orifices 62 may be provided by passages in the wall which communicate with a closed ring groove 105, such groove leading to an orifice 62. Slots 106 are added about the nozzles 62 to permit better escape of the fluid.

Cooling fluid may be directed through the tubular housing to exit from a passage 81 for bathing the cutting tool. Cooling or cutting fluid may also be fed at 83 to be carried through a central passage 82 in the adjustment rod 31.

Withdrawing

Substantially immediately upon the execution of the rough boring step, the tubular housing 10, together with the rotationally driven spindle 23, is withdrawn from the cavity 13 along an upward stroke while the cutting tool 24 is repositioned for continuous finish boring of the cavity wall during such withdrawal. The repositioning of the cutting tool is illustrated in FIG. 5, wherein rod 31 is raised by screw actuator 32 to permit pivot arm 34 to swing to the right, permitting the radially moveable surface 37 to move away from the cylindrical wall 13 thereby causing the surface 40 of the cutting tool to have a smaller side relief angle 41 characteristic of a finish-machining mode. The depth of cut of such finish-machining step is also reduced to about 0.045 inches.

Milling

Substantially upon the completion of finish boring, and with the cutting tool withdrawn to the top of the cavity, such as shown in FIG. 3, the tubular housing 10 and spindle 23 will be telescopically withdrawn into the collar 50 or fixed housing. The fixed housing is positioned closely adjacent the face 64 of the workpiece 14, preferably within a distance 65 of about 1.5-2.5 inches and commensurate with the height of the spindle head. At this stage of withdrawal, the workpiece 14 is moved relatively transversely with respect to the axis of the spindle for carrying out milling while radially adjusting the cutting tool for milling of face 64. The workpiece may be moved on a support fixture 66 by an exterior actuator 67. Fixture 66 is guided by rails 68 a support 70 locked in key hole tracks 69 in the fixture support 70. The tubular housing 10 is guided and steered within the fixed housing 50 or collar to attain close milling tolerances.

To prepare the cutting tool for milling operation, the pivot arm is moved to a satisfactory radial position so that the other surface 71 of the cutting tool insert is positioned to provide a side relief angle with respect to the face 64 of the milling block of a predetermined amount.

Apparatus for Stitch-Machining

Much of the apparatus for this aspect of the invention has been previously identified in connection with the structure for carrying out the method. However, the apparatus for stitch-machining the walls of an axially deep and narrow cylindrical cavity 13 of a workpiece 14 comprises: (a) a rotary driven spindle 23 of sufficient length to extend substantially throughout the axial extent 12 of the cavity, the spindle carrying a radially adjustable cutting tool 14 at its extremity; (b) a tubular housing support (10,19,20) for journaling the spindle 23, the tubular housing 10 being axially moveable for conjoint axial movement with the spindle and fixed against rotational movement; (c) means (47,45,46,13,23a) (56,57,58,59,50,53) for accurately guiding and steering the tubular housing support and spindle within the cavity; and (d) means (31,38,37,34,35) for radially adjusting the orientation of the cutting tool to effect different modes of machining with the tool.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of stitch-machining the walls of a cylindrical blind cavity of a workpiece, said cavity being deep and narrow with respect to the axis of said cavity, comprising:
    (a) supporting a tubular housing for axial movement throughout substantially the axial extent of said cavity interior and in close-fitting tolerance to the walls of said cavity, said tubular housing having a free end;
    (b) rotationally driving a spindle in said tubular housing in a manner for conjoint axial movement with the tubular housing, said spindle extending beyond said tublular housing end for carrying a radially adjustable cutting tool;
    (c) inserting said tubular housing together with said rotationally driven spindle into said cavity with a cutting tool radially positioned for rough boring of said cavity walls, while guiding and steering said tubular housing and spindle to accurately concentrically position the cutting tool with respect to said cavity axis; and
    (d) substantially immediately upon the execution of said rough boring, withdrawing said tubular housing from said cavity together with said rotationally driven spindle, said cutting tool being repositioned for finish boring of said cavity wall during withdrawal.

2. The method as in claim 1, in which said method further comprises, in step (d), withdrawing said tubular housing and spindle into a fixed support positioned closely adjacent the face of said workpiece, and the addition of step (e) whereby, substantially upon execution of said finish boring and withdrawal, relatively moving said workpiece transversely with respect to the axis of said spindle for carrying out milling while radially adjusting said cutting tool for milling of said face, said tubular housing being guided and steered within said fixed support to attain close milling tolerances.

3. The method as in claim 2 in which said tubular housing is telescopically supPorted in a fixed tubular housing stationed adjacent the workpiece and acting as a fixed support.

4. The method as in claim 3, in which said tubular housing and drive for said spindle are commonly supported on a slide for axial movement independent of said fixed housing, said slide permitting said tubular housing to be carried to within 1.5–2.5 inches of the bottom of said cavity.

5. The method as in claim 1 in which, in step (b), said spindle is rotationally driven at a speed in the range of 10,000–40,000 rpm, and said tubular housing and spindle is inserted and withdrawn from said cavity at a lineal speed of 400–800 inches/minute.

6. The method as in claim 1 in which, in step (b), said cutting tool is radially adjustable by pivotally supporting said cutting tool on a pivot arm on said spindle offset from the axis of said spindle, said pivot arm having a radially moveable surface cammed by an independently moveable rod extending axially through said spindle.

7. The method as in claim 1 in which, in step (c), said guiding is carried out by use of fluidic bearings wherein hydrostatic fluid pressure is communicated to the spacing between said spindle and tubular housing for promoting a fluid film therebetween.

8. The method as in claim 7, in which said fluid bearings are adjustable by varying the fluid pressure communication in the range of 20–40 psi.

9. The method as in claim 8, in which said hydrostatic fluid pressure is directed through said tubular housing to circumferentially spaced locations thereabout for promoting said uniform film to concentrically align said housing and spindle, and to effect fluidic damping of said spindle and cutting tool.

10. The method as in claim 1 in which, in step (c), said steering is carried out by momentarily directing unbalanced hydrostatic fluid pressure against the exterior of said tubular housing to attain incremental radial adjustments.

11. The method as in claim 1 in which, in step (c), said cutting tool has one to four cutters arranged about the circumference of said spindle for carrying out rough boring, and, in step (d), only one of said cutters is permitted to be engaged with the cavity wall during finish boring.

12. An apparatus for stitch-machining the walls of an axially deep and narrow cylindrical cavity of a workpiece, comprising:
   (a) a rotary driven spindle of sufficient length to extend substantially throughout the axial extent of said cavity, the spindle carrying a radially adjustable cutting tool at its extremity;
   (b) a tubular housing support for journaling said spindle, said tubular housing being axially movable for conjoint axial movement with said spindle and fixed against rotational movement;
   (c) an axially fixed and radially adjustable collar through which said tubular housing support telescopically extends;
   (d) a seat fixed axially for supporting said collar while allowing radial adjustment of said collar therein;
   (e) means for accurately guiding and steering said tubular housing within said collar and said spindle within said tubular housing, comprising (i) passages extending through said tubular housing, terminating in circumferentially spaced orifices at the inner surface of said tubular housing for discharging hydrostatic fluid pressure and thereby promote a concentrically aligning fluid film between said spindle and tubular housing, (ii) passages terminating in orifices spaced circumferentially about an inner surface of said seat and collar for respectively and selectively directing an unbalanced hydrostatic fluid pressure against said collar and said tubular housing.

* * * * *